UNITED STATES PATENT OFFICE.

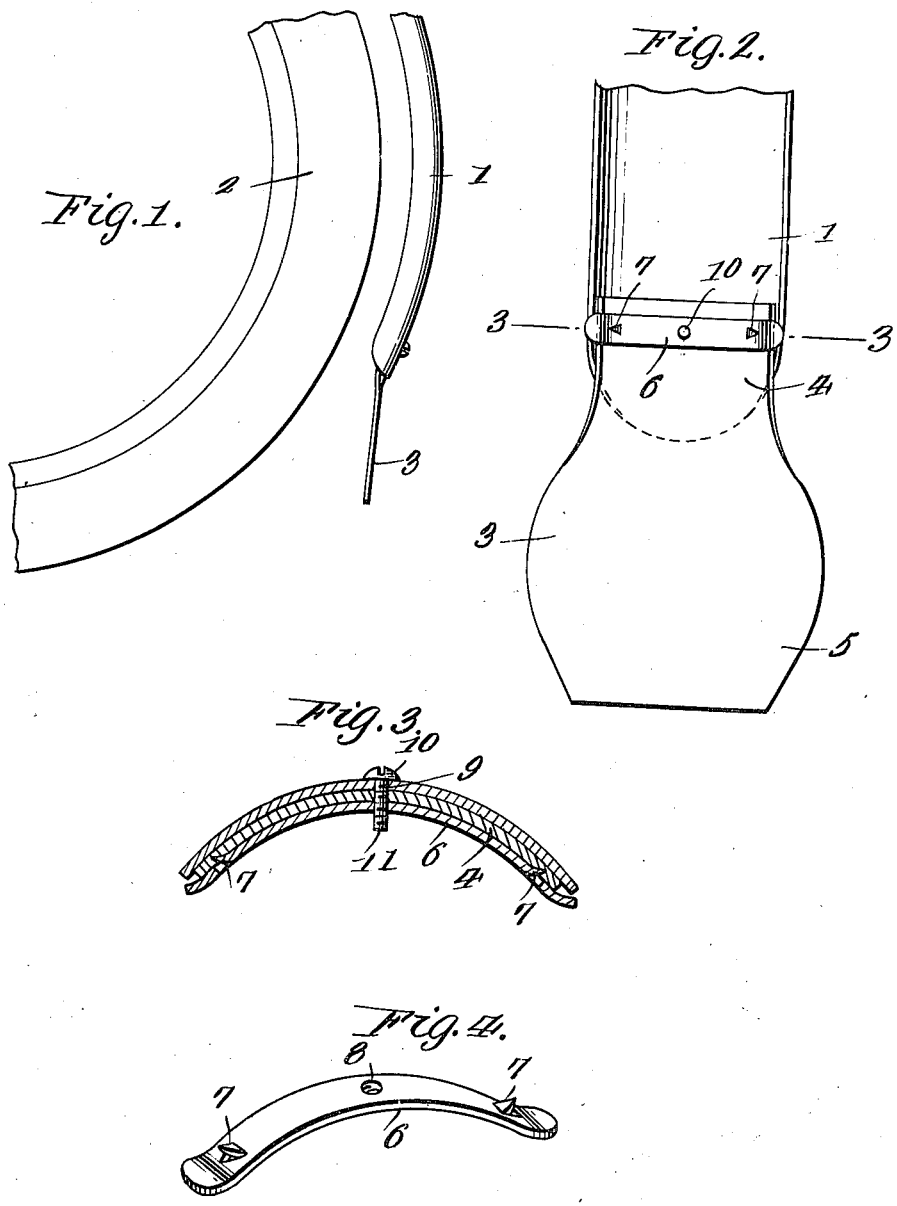

RAYMOND W. NEWTON, OF ST. CLOUD, MINNESOTA.

SPLASHER-BOOT CLAMP.

1,178,337.   Specification of Letters Patent.   Patented Apr. 4, 1916.

Application filed August 18, 1915. Serial No. 46,139.

*To all whom it may concern:*

Be it known that I, RAYMOND W. NEWTON, a citizen of the United States, residing at St. Cloud, in the county of Stearns and State of Minnesota, have invented certain new and useful Improvements in Splasher-Boot Clamps, of which the following is a specification.

My invention relates to an improved clamp of novel construction for holding a leather splasher boot in place on the mud guard of bicycles, motorcycles and the like.

It often happens with the usual fastening means for splasher boots of the type above mentioned, that due to inferior fastening means the boot is lost or becomes torn or is displaced from its most effective position.

It is, therefore the prime object of the present invention to provide a simple clamp for holding the splasher boot in an adjusted position relative to the mud guard of the vehicle, on which the same is mounted.

Another object resides in providing a simple clamp of novel construction which holds the splasher boot and clamp in place by means of a single screw.

Other features of the invention will be apparent from the drawings and description forming this specification.

In the drawings: Figure 1 is a side elevation showing a portion of the wheel and mud guard of a bicycle with the splasher boot and clamp applied thereto. Fig. 2 is a forward elevation of the mud guard, splasher boot and clamp. Fig. 3 is a sectional view on the line 3—3 of Fig. 2, and Fig. 4 is a perspective view of the clamp removed from the guard.

In detail: The clamp, as shown in the drawings, is applied to a mud guard 1 positioned behind the wheel 2 and serves to hold in place a flexible leather splasher boot 3, the end 4 of which is smaller than the body portion 5 and fits adjacent the inner surface of the mud guard 1.

The clamp comprises a metal strip 6 curved to fit the contour of the mud guard, and be positioned transversely therein. At each end the metal strip is provided with a spur 7 struck up from the body of the strip. The strip is further apertured at substantially its center as shown at 8, the said aperture being threaded for purposes to be hereinafter set forth.

The mud guard 1 is drilled at 9 to receive a screw 10, the shank 11 of which, when the splasher boot is positioned extends through the mud guard splasher boot and is threaded into the aperture 8 of the clamp. Thus as the screw 10 is tightened the clamp 6 is drawn against the splasher boot 3 causing the spurs 7 to penetrate the latter and thus supporting it at each side against displacement.

If desired the clamp 6 may be made of spring metal and of slightly different curvature than the guard 1, then when the screw 10 is tightened up the clamp 6 will exert an expanding tension and thereby serve to prevent the screw 10 from working out.

From the foregoing description, and the annexed drawings, it will be seen that I have provided a simple means of holding the splasher boot in place, which means comprises a minimum number of parts and is easily and cheaply manufactured.

While I have herein illustrated one specific embodiment of my invention for the purpose of disclosing the latter, it is, however, to be understood that I do not limit myself to such construction except in so far as the appended claims import.

I claim:—

1. The combination with a mud guard and splasher boot, of means for attaching the latter to the mud guard, said means comprising a clamp consisting of a strip of metal shaped to fit within the guard, and a screw extended through the guard and splasher boot and clamping said strip of metal against the splasher boot to support the latter, substantially as described.

2. The combination with a mud guard and splasher boot, of means for attaching the latter to the mud guard, said means comprising a clamp consisting of a metal strip shaped to fit the guard, a screw extended through said guard and threaded in said strip and clamping the splasher boot between the guard and strip, and means at each end of said strip for penetrating said boot to hold the strip and boot against movement relative to each other, substantially as described.

3. The combination with a mud guard and splasher boot, of clamping means to hold the latter against said guard, said means comprising a strip of spring metal, and a screw extended through the mud guard and splasher boot and threaded in said strip and confining the splasher boot between the strip and guard, substantially as described.

In testimony whereof I affix my signature in presence of two witnesses.

RAYMOND W. NEWTON.

Witnesses:
W. W. SMITH,
H. SCHINDLER.